United States Patent
Hanayama

(10) Patent No.: US 8,472,049 B2
(45) Date of Patent: Jun. 25, 2013

(54) IMAGE FORMING SYSTEM, IMAGE FORMING APPARATUS, AND JOB MANAGEMENT PROGRAM

(75) Inventor: Yukiyoshi Hanayama, Inazawa (JP)

(73) Assignee: Brother Kogyo Kabushiki Kaisha, Nagoya-shi, Aichi (JP)

(*) Notice: Subject to any disclaimer, the term of this patent is extended or adjusted under 35 U.S.C. 154(b) by 1054 days.

(21) Appl. No.: 12/411,896

(22) Filed: Mar. 26, 2009

(65) Prior Publication Data

US 2009/0268238 A1  Oct. 29, 2009

(30) Foreign Application Priority Data

Apr. 28, 2008 (JP) .................. 2008-117613

(51) Int. Cl.
  *G06F 3/12* (2006.01)
  *G06F 17/00* (2006.01)
(52) U.S. Cl.
  USPC .................. 358/1.15; 358/1.13; 726/1
(58) Field of Classification Search
  USPC .................. 726/16, 1; 358/1.13, 1.15
  See application file for complete search history.

(56) References Cited

U.S. PATENT DOCUMENTS

| | | | |
|---|---|---|---|
| 4,780,871 A | 10/1988 | Arakawa | |
| 2005/0183141 A1* | 8/2005 | Sawada | 726/16 |
| 2006/0221384 A1* | 10/2006 | Tanaka | 358/1.15 |

FOREIGN PATENT DOCUMENTS

| | | |
|---|---|---|
| JP | 62011339 A | 1/1987 |
| JP | 09-263023 | 10/1997 |
| JP | 10-233864 | 9/1998 |
| JP | 11-091210 | 4/1999 |
| JP | 2003131854 A | 5/2003 |
| JP | 2003-259067 | 9/2003 |
| JP | 2004268535 A | 9/2004 |
| JP | 2004362180 A | 12/2004 |
| JP | 2006281593 A | 10/2006 |
| JP | 2007210237 A | 8/2007 |

OTHER PUBLICATIONS

JP Office Action dtd Apr. 13, 2010, JP Appln. 2008-117613, English translation.

* cited by examiner

*Primary Examiner* — Thomas Lett
*Assistant Examiner* — Justin Katzwhite
(74) *Attorney, Agent, or Firm* — Banner & Witcoff, Ltd.

(57) ABSTRACT

An image forming system for communicably connecting a data processor and an image forming apparatus can include a registration unit for registering a print job based on a print request, a printing unit for conducting print processing based on a print job registered in the registration unit, an authentication unit for, when the print job is a locked job with an unlocking condition, prohibiting print processing of the locked job until the unlocking condition is fulfilled, and a prohibition unit for prohibiting print processing of a normal job, which is registered in the registration unit after registration of the locked job, without the unlocking condition.

18 Claims, 10 Drawing Sheets

FIG.5

| Registration order | User | Job |
|---|---|---|
| 1 | A | secure job S1 |
| 2 | B | secure job S2 |

FIG.6

| Registration order | User | Job |
|---|---|---|
| 1 | A | secure job S1 |
| 2 | B | normal jobs G1 |
| 3 | A | normal jobs G2 |

FIG.7

| Registration order | User | Job |
|---|---|---|
| 1 | A | secure job S1 |
| 2 | B | normal jobs G1 |
| 3 | B | normal jobs G3 |
| 4 | B | secure job S2 |
| 5 | C | normal jobs G4 |
| 6 | C | secure job S3 |

IMAGE FORMING SYSTEM, IMAGE FORMING APPARATUS, AND JOB MANAGEMENT PROGRAM

CROSS REFERENCE TO RELATED APPLICATION

This application claims priority from Japanese Patent Application No. 2008-117613 filed Apr. 28, 2008. The entire content of this priority application is incorporated herein by reference.

TECHNICAL FIELD

The present disclosure relates to an image forming system, image forming apparatus, and a job management program.

BACKGROUND

There have been image forming systems which communicably connect an image forming apparatus and a data processor and comprises a secure print function. When utilizing this secure print function, a user makes a print request, with an unlocking condition (for example, a password) designated on a data processor. And then, in the image forming apparatus side, a print job based on the print request is registered as a locked job, and the print processing of the locked jog is prohibited until the above unlocking condition is fulfilled (for example, until the same password as the above password is input in the image forming apparatus). When the unlocking condition is fulfilled, other configurations wait for the end of print processing if it is in the middle of print processing of other print job, before conducting print processing of a locked job (hereinafter referred to as "conventional configuration A"), or cancels print processing if it is in the middle of the print processing of other print job, before conducting print processing of a locked job (hereinafter referred to as "conventional configuration B").

SUMMARY

However, when the above conventional configuration A is employed, a user of the locked job maybe in an inconvenient situation since the print processing of the user's locked job may have to enter a standby state due to print processing of other print job requested after the user's print request. On the other hand, when the above conventional configuration B is employed, it is also inconvenient for a user of the above-mentioned other print job, since print processing of the other print job may have to be cancelled. An image forming system for communicably connecting a data processor and an image forming apparatus can include a registration unit for registering a print job based on a print request, a printing unit for conducting print processing based on a print job registered in the registration unit, an authentication unit for, when the print job is a locked job with an unlocking condition, prohibiting print processing of the locked job until the unlocking condition is fulfilled, and a prohibition unit for prohibiting print processing of a normal job, which is registered in the registration unit after registration of the locked job, without the unlocking condition.

BRIEF DESCRIPTION OF THE DRAWINGS

Illustrative aspects in accordance with the invention will be described in detail with reference to the following figures wherein:

FIG. 5 is a pattern diagram showing a registration state of a waiting line (part 1);

FIG. 6 is a pattern diagram showing a registration state of a waiting line (part 2);

FIG. 7 is a pattern diagram showing a registration state of a waiting line (part 3);

DETAILED DESCRIPTION

One aspect of the present invention is explained with reference to FIGS. 1 to 10. [Electrical configuration of image forming system]

Figure 1:
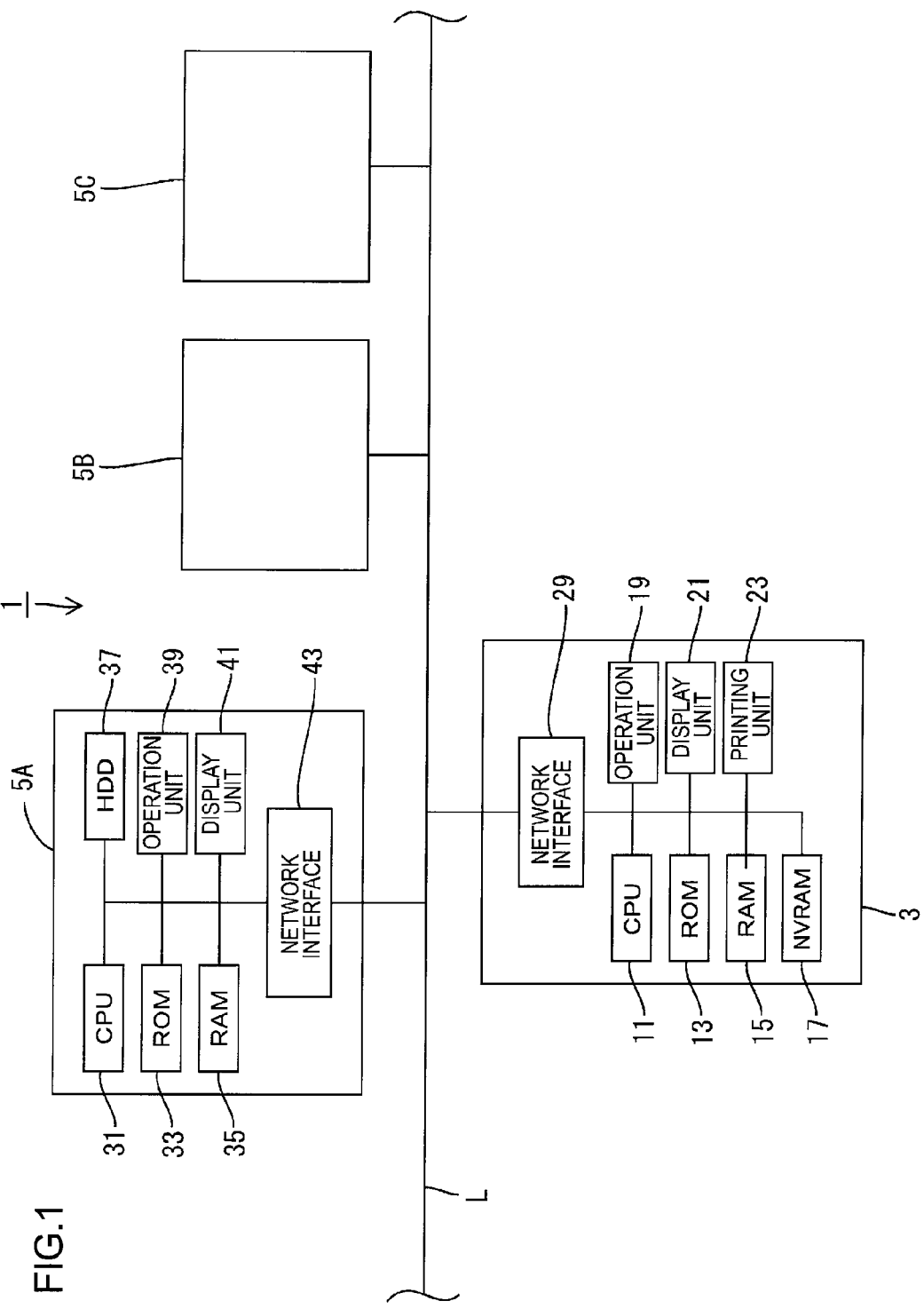
FIG. 1 is a block diagram showing an electrical configuration of an image forming system according to one aspect of the present invention.
Figure 2:
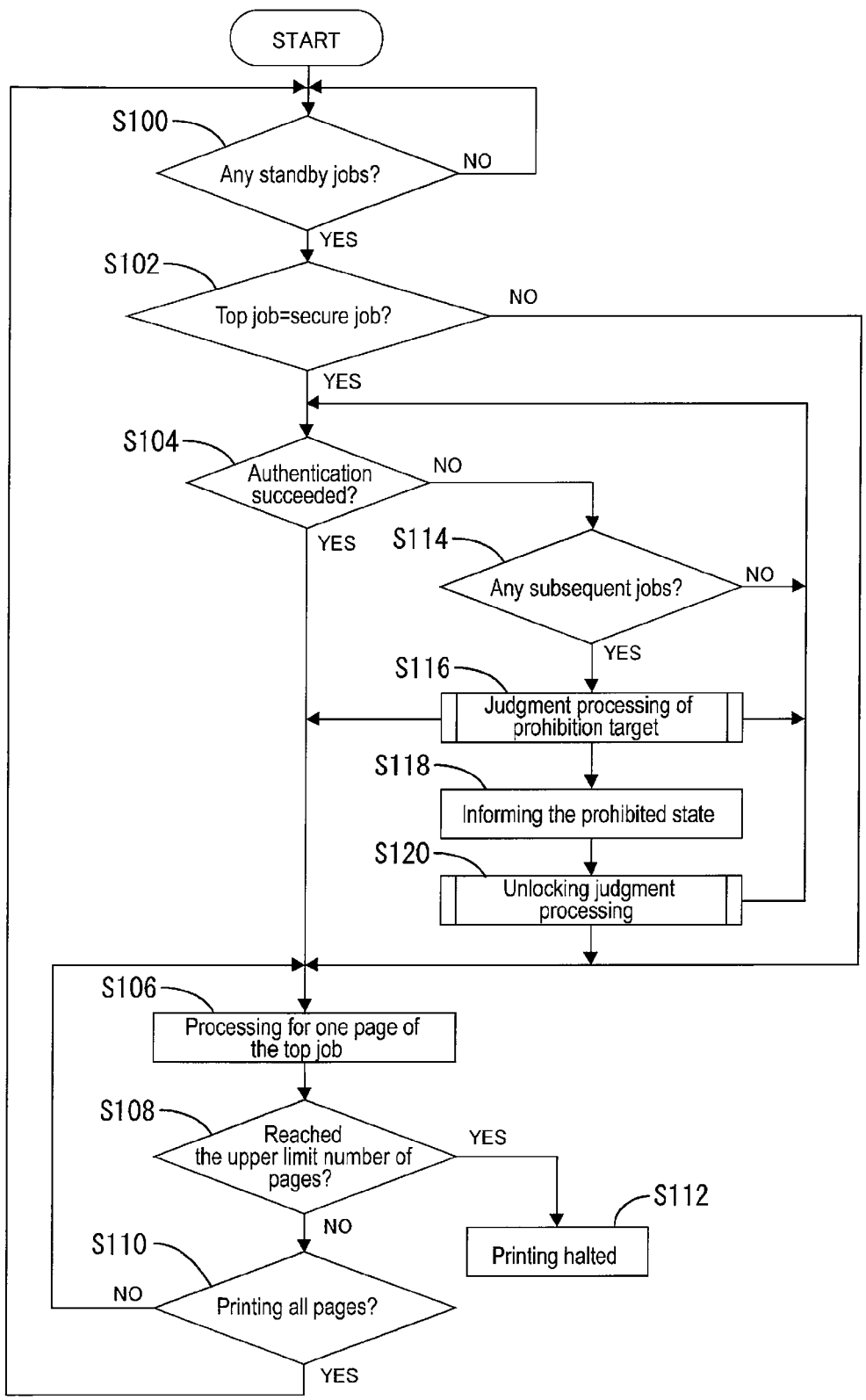
FIG. 2 is a flow chart showing a job management processing.

FIG. 1 is a block diagram showing an electrical configuration of an image forming system 1. The image forming system 1 includes an image forming apparatus 3 and a plurality (shown three in FIG. 1) of computers 5 (one example of a data processor) connected through a communication line L. Hereinafter, a user of the computer 5A is called "user A", a user of the computer 5B is called "user B", and a user of the computer 5C is called "user C". Also, each computer 5 has the same basic configuration, and thus, only a configuration of the computer 5A is illustrated in FIG. 1 will be described in detail.

(1) Image Forming Apparatus

The image forming apparatus 3 can include a CPU 11, a ROM 13, a RAM 15, an NVRAM 17 (nonvolatile memory), an operation unit 19, a display unit 21, a printing unit 23, and a network interface 29.

The ROM 13 can record, for example, job management programs other than the programs for controlling basic operations of the image forming apparatus 1, and, in accordance with the program read out from the ROM 13, the CPU 11 controls the operation of the image forming apparatus 1, while at the same time, recording the processing results into the RAM 15 and the NVRAM 17.

The operation unit 19 is constituted by a plurality of buttons and allows a user to conduct various inputting operations such as the authentication operation. The display unit 21 can include a liquid crystal display and a lamp and capable of displaying, for example, various setting screens and operational states. The printing unit 23 conducts printing to a paper sheet based on print data to be printed. The network interface 29 is connected to computer 5 via a communication line L, so as to enable mutual data communication.

(2) Computer

Each computer 5 can have the same configuration that includes a CPU 31, a ROM 33, a RAM 35, a hard disk 37, an operation unit 39, a display unit 41, and a network interface 43. The hard disk 37 can record various programs, such as an application soft for creating printing data and a printer driver.

The operation unit 39 can include a keyboard and a pointing device, while the display unit 41 comprises such as, for example, a liquid crystal display. And also, the network interface 43 is connected to a communication line L.

[Secure Print Function]

For example, when each user conducts printing based on data stored in his/her own computer 5, so-called PC printing, in the image forming apparatus 3, a print request is firstly performed through an inputting operation in the operation unit 39. Then, the CPU 31 in the computer 5 sends printing data along with the print request command to the image forming apparatus 3. In response, the CPU 11 in the image forming apparatus 3 produces a print job based on the received print request command and the printing data, and then registers this printing job on a waiting line (queue). Here, the CPU 11 functions as a "registration unit".

Here, the image forming system 1 in the present aspect has a secure print function. When using this secure print function, a user makes a print request, with an unlocking condition (for example, a password and an ID) designated in the computer 5. And then, in the image forming apparatus 3, a print job based on the print request is registered on a waiting line as a secure job (one example of a "locked job"), and the print processing for the secure job is prohibited until the above unlocking condition is fulfilled (for example, until the same password as the above password is input through the operation unit 19 in the image forming apparatus 3). Hereinafter, a determination if an unlocking condition is fulfilled is called an "authentication judgment", an operation of a user for inputting a password and an ID for the authentication judgment is called an "authentication operation", and a case where an unlocking condition is fulfilled through the authentication operation is called a "success of authentication".

For example, in a case where a confidential document data is needed to be printed through PC printing, and when a print request is made without using a secure print function, the confidential document may be printed in the image forming apparatus 3 before the user who had made the print request reaches the image forming apparatus 3. In response, when the secure print function is used, making a print request is not sufficient to print a confidential document in the image forming apparatus 3. Unless the user who had made the print request conducts an authentication operation, and moreover, succeeds in the authentication, the above confidential documents will not printed. As a result, a confidential document is prevented from passing to a person other than the user who had made a print request.

[Job Management Processing]

When the image forming apparatus 3 is turned on, the CPU 11 creates a print job every time it receives a print request, and registers the print job on a waiting line in the created order (in other words, in the order of print requests). Additionally, the CPU 11 executes the job management processing shown in FIGS. 2 to 4 based on the above job management program, so as to manage the print job registered on the waiting line. Print jobs registered on a waiting line may be a secure job or a normal job. The normal job is a print job (a so-called "unlocked job"), created based on a print request that has been made without using the secure print function.

The CPU 11 first judges whether a standby job exists in S100. The standby job is a print job that is registered in a waiting line and waiting for the print processing of its own. In the present aspect, a standby job is understood as existing, not only when other subsequent print jobs are waiting (for example, a print job is in the middle of print processing), but also when a normal job following a secure job is waiting in a waiting line since the secure job is not yet authenticated (no authentication operation is performed, or, though an authentication operation has been performed, the authentication is not yet successful).

When a standby job is judged to be existing (S100: Yes), it is then judged whether a top job is a secure job in S102. The top job is a print job to be subjected to print processing first in the above standby jobs, and also a print job in the uppermost level in, for example, the registration order in the present aspect.

(1) When the Top Job is a Normal Job

When the top job is a normal job (S102: No), the process proceeds to S106, and the CPU 11 instructs the printing unit 23 to execute print processing based on print data corresponding to the top job. However, the image forming apparatus 3 comprises a print number limiting function. The print number limiting function is a function for limiting the upper limit number of paper sheets, the image forming apparatus 3 can print within a predetermined range, such as a period of time and a user. Therefore, the CPU 11 instructs the printing unit 23 to execute print processing for only one page based on printing data corresponding to the top job in S106, and then judges in S108 whether or not the accumulated total of paper sheets having been printed so far reached the above upper limit number. Then, when it reached the upper limit number (S108: Yes), the print processing is halted in S112. In addition, this halted state can be cleared by conducting a prescribed operation such as, for example, changing a setting value of the upper limit number or initializing the accumulated total of pages. Here, the CPU 11 functions as a "limiting unit".

On the other hand, when the accumulated total pages did not reach the upper limit number (S108: No), and moreover, the print processing of the top job has not been completed for all the pages (S110: No), the process returns to S106, and then the CPU 11 instructs the printing unit 23 to execute printing processing for the next page. In response, when the upper limit number has not been reached (S108: No), and moreover, when the print processing of the top job has been completed for all the pages (S110: Yes), the process returns to S100.

(2) When the Top Job is a Secure Job

When the top job is a secure job (S102: Yes), it is judged whether the authentication is successful in S104. When authentication is achieved (S104: Yes), the process moves on to the above S106, and the CPU 11 instructs the printing unit 23 to execute print processing based on print data corresponding to the present secure job.

On the other hand, if the top job is not authenticated state (S104: NO), the CPU 11 prohibits print processing for the above secure job, and then proceeds to S114. Here, the CPU 11 functions as an "authentication unit". In S114, it is judged whether or not a subsequent job exists. A subsequent job means a print job of standby jobs other than the top job.

Here, as shown in FIG. 5 for example, when an unauthenticated secure job S2, other than a secure job S1 as a top job, is registered on a waiting line, the present secure job S2 is a subsequent job. Additionally, the present aspect is not limited to this, and a normal job may be a subsequent job. In particular, when normal jobs G1 and G2 were registered on a waiting line (in other words, print requests were made) after the secure job S1 as shown in FIG. 6, the CPU 11 prohibits the printing unit 23 to conduct the print processing of the normal jobs G1 and G2 until a success of authentication of the secure job S1 is judged (see S104 in FIG. 2). Here, the CPU 11 functions as a "prohibition unit". However, there is an exception that is mentioned later.

Figure 3:
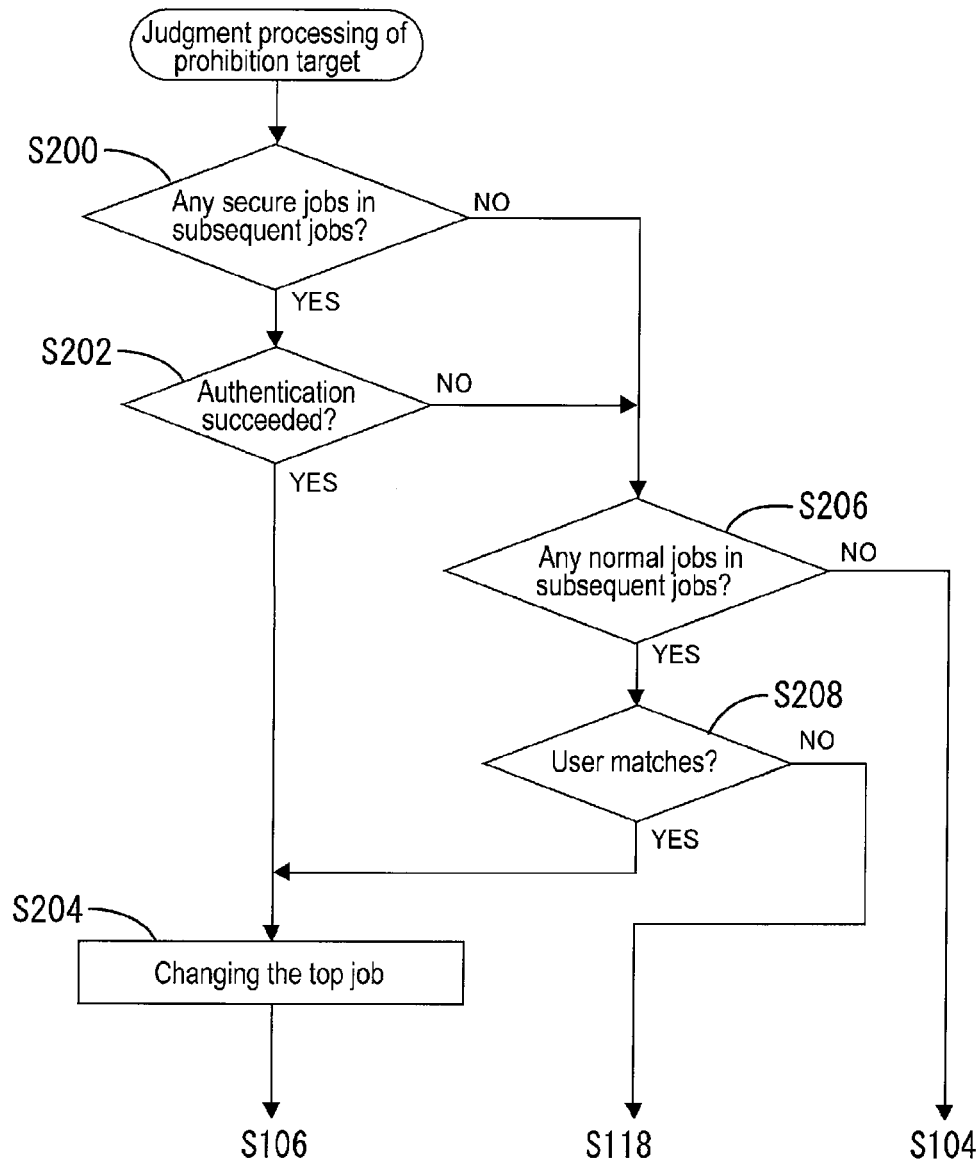
FIG. 3 is a flow chart showing judging processing of prohibition target.

When the CPU 11 judged that a subsequent job does not exist (S114: No), then the process returns to S104. In response, when CPU 11 judged that a subsequent job exists (S114: Yes), then judgment processing of prohibition target is executed as shown in FIG. 3 in S116. In this judgment processing of prohibition target, processing for selecting the print processing of a job as a prohibition target, that should be prohibited based on an unauthenticated secure job, is conducted.

In particular, as shown in FIG. 3, a subsequent job is judged whether it includes a secure job in S200, and when the subsequent job is judged to include the secure jobs S2 and S3 as shown in FIGS. 5 and 7 (S200: Yes), the secure jobs S2 and S3 as the present subsequent job are judged whether their authentication is successful in S202. Then, for example, when the authentication of the secure job S2 (S3) is judged to be successful (S202: Yes), the secure job S2 (S3) becomes a top job in S204, while the registration order of the secure job S1 (which has been the top job so far) is now moved down by one order, and the process proceeds to S106 in FIG. 2.

This allows print processing of the secure job S2 (S3) to be executed. In addition, when judging whether or not the print processing of the secure jobs S2 and S3 as the subsequent job should be executed earlier than the print processing of the secure job S1, the user of the secure jobs S2 and S3 is not taken into consideration. As mentioned, it is preferable from the viewpoint of the above object of the secure print function that, when the authentication of the secure jobs S2 and S3 which have been registered later is successful, the print processing thereof is executed earlier than that of the secure job S1 which has been registered first.

When subsequent jobs do not include a secure job (S200: No), or, when the subsequent jobs include a secure job, however, the secure job is unauthenticated (S200: Yes, however, S202: No), the process proceeds to S206. In S206, it is judged whether the subsequent jobs include a normal job. For example, as shown in FIG. 5, when the subsequent jobs do not include a normal job (S206: No), the process moves back to S104 in FIG. 2.

On the other hand, as shown in FIGS. 6 and 7, when the subsequent jobs include a normal job (S206: Yes), it is judged whether a normal job of a user who is the same user of the secure job as the top job is included in the normal job included in subsequent jobs in S208. Additionally, when each user makes a print request with his/her own computer 5, user data (such as a user name and a user ID) along with the present print request command are transmitted to the image forming apparatus 3, and the CPU 11 therefore recognizes the user data of each print job.

When a normal job of a user who is the same user of the secure job as the top job is judged to be included (S208: Yes), the process proceeds to S204, and the present normal job becomes the top job, while the registration order of the secure job (which has been the top job so far) is moved down by one in the order. For example, as shown in FIG. 6, when the user matches between the secure job S1 and the normal job G2, the normal job G2 is not regarded as a job of prohibition target, and its print processing is allowed to be executed earlier than the secure job S1.

When a normal job of a user who is the same user of the secure job as the top job is judged not to be included (S208: No), the process proceeds to S118 in FIG. 2. For example, as shown in FIG. 7, when none of the users of the normal jobs G1, G3, and G4 matches the user of the secure job S1, the normal jobs G1, G3, and G4 are decided as the job of prohibition target, and the print processing thereof are prohibited due to the unauthenticated secure job S1. Therefore, in S118, processing for informing this prohibited state of print processing of the job of prohibition target is executed.

In particular, the informing processing is conducted at least in any one of the following ways.

(A) A display light (for example, an LED) in the image forming apparatus 3 is activated in a prescribed pattern.

(B) User data of a secure job as the top job is displayed on the display unit 21 in the image forming apparatus 3 In the example of FIG. 7, a user name "A" of the secure job S1 is displayed. This allows users B and C to know whose secure job is causing the print processing of their own normal jobs G1, G3 and G4 to be suspended.

(C) To display on the display unit 41 a message encouraging an earlier authentication operation of the secure job by means of, for example, a pop-up menu.

In the example of FIG. 7, the above message can be displayed on the display unit 41 of the computer 5A. Earlier cancellation of a prohibited state of the job of prohibition target may therefore be expected. In addition, a noise or speech-based technique may be employed as well.

Figure 4:
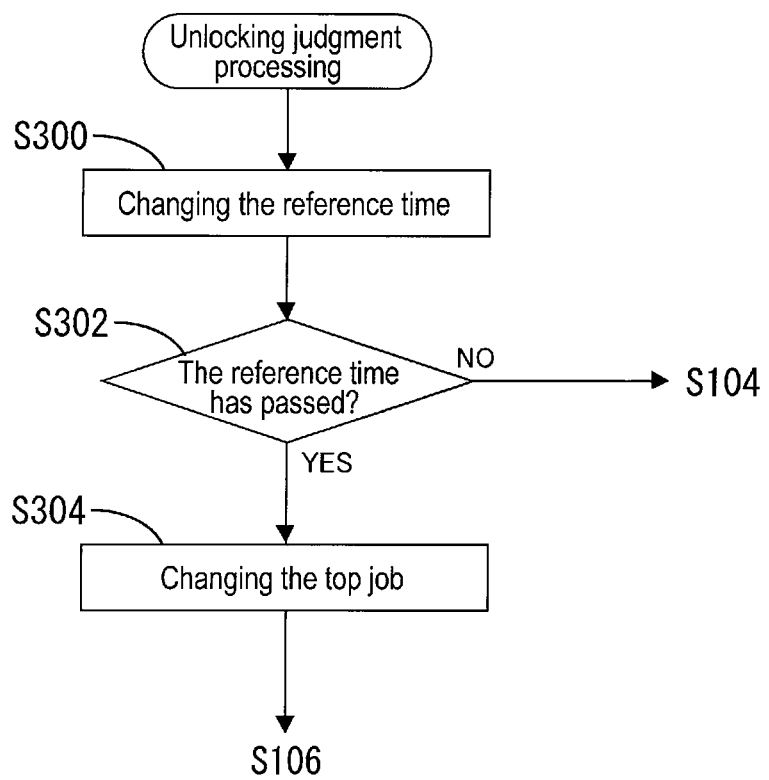
FIG. 4 is a flow chart showing unlocking judgment processing.

Next, the CPU 11 executes unlocking judgment processing shown in FIG. 4 in S120. In the unlocking judgment processing, a prohibited state of the above job of the prohibition target is unlocked, when the authentication of a secure job as the top job was not judged to be successful within a time until a reference time T has passed after the secure job was registered on a waiting line (or a print request was made). Here, the CPU 11 functions as a "judgment unit and/or unlocking unit".

Particularly, in S300 in FIG. 4, changing the reference time is conducted in at least any one of the following ways. Here, the CPU 11 functions as a "first changing unit".

(A) The larger the total amount (the number of all the subsequent jobs, the total number of pages, or the total amount of data) of subsequent jobs (one example of a "print job of unprinted processing") is, the shorter the reference time T is adjusted. In addition, the total amount maybe not of all the subsequent jobs, but the subsequent jobs in a prohibited state due to the unauthenticated secure job of the top job (for example, the normal jobs G1 and G3 in the example of FIG. 7). It can be understood that the larger the total amount of the subsequent jobs is, the larger the number of users are waiting for print processing. Therefore, as mentioned, the larger the total amount of subsequent jobs is, the earlier the prohibited state of a subsequent job is preferred to be unlocked by shortening the reference time T.

(B) The larger the number of pages of the print job in the highest registration order in subsequent jobs (one example of a "print job to be subjected first to print processing when its prohibited state is unlocked by an unlocking unit": the normal job G1 in the examples in FIGS. 6 and 7: hereinafter referred to as an "immediate job") is, or the larger the amount of data is, the longer the reference time T is extended. For example, in FIG. 6, when the number of pages of the normal job G1 as an immediate job is large, print processing thereof takes a longer time. Therefore, even when the secure job S1 is successfully authenticated right after unlocking the prohibited state of the normal job G1 and starting print processing of the normal job G1, it takes a long time until the start of print processing of the secure job S1. Taking the user of the secure job S1 into consideration, like the changing way mentioned above, it is therefore preferred to approve the print processing of the normal job G1, which takes a longer time for print processing, earlier than the secure job S1 by extending the reference time T longer when, for example, the number of pages of the normal job G1 is larger.

In addition, when employing both of the above changing ways (A) and (B), divisions and subtractions are performed by a value corresponding to the total amount of subsequent jobs, and further, multiplications and additions are performed by a value that can corresponding to the number of pages of an immediate job, relative to a reference time T at the present time.

The CPU 11 judges, after changing a reference time T in S300, whether the reference time T has passed since a secure job as the top job was registered on a waiting line (or a print request was made) in S302. If the reference time T has not yet passed (S302: No), the process moves back to S104 in FIG. 2. In response, if the reference time T has passed (S302: Yes), it means a secure job as the top job is unauthenticated by the time the reference time T has passed. Consequently, in S304, the prohibited state of the jobs of prohibition target (the normal job G1 in the example of FIG. 6, and the normal jobs G1 and G3 in the example of FIG. 7), that has been prohibited due to such unauthentication, is unlocked. In particular, the registration orders of the normal jobs G1 and G3 in the prohibited state should be unlocked are changed to higher than that of the secure job S1, and the process proceeds to S106 in FIG. 2. This allows the print processing of the normal job G1, that was regarded as the top job in the example of FIG. 7, to be executed earlier than that of the secure job S1, and after that, the normal job G3 becomes the top job so that the print processing thereof is executed earlier than that of the secure job S1.

[Effect of the Present Aspect]

Figure 8:
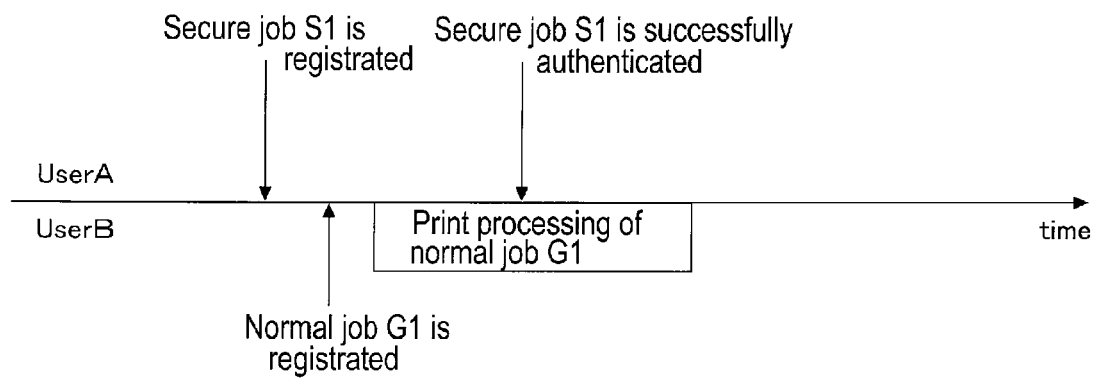
FIG. 8 is a time chart (the conventional configuration) showing a relationship of registration/print processing between a secure job and a normal job.
Figure 9:
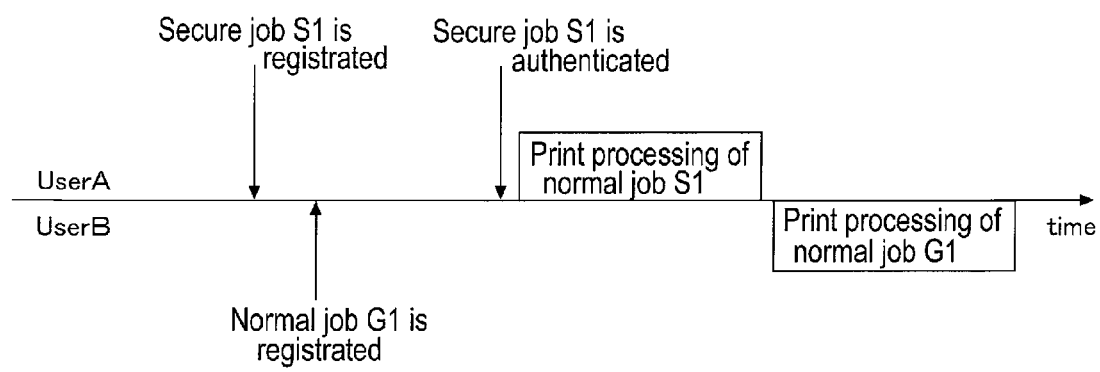
FIG. 9 is a time chart (the present aspect) showing a relationship of registration/print processing between a secure job and a normal job.

A case, where the normal job G1 of a user B is registered on a waiting line after the secure job S1 of a user A was registered and during the unauthenticated state of the present secure job S1, can be compared with a conventional configuration. Here, in the conventional configuration as shown in FIG. 8, print processing of the normal job G1 is executed without waiting for a success of authentication of the secure job S1. Therefore, when the authentication of the secure job S1 succeeds during the print processing of this normal job G1, the print processing of the secure job S1 has to wait until the end of the print processing of the normal job G1 in the above conventional configuration A. From the viewpoint of the user A, it is not desirable that the print processing of his/her secure job S1 has to wait due to the print processing of the normal job G1 of other user B, who made the print request (registered on a waiting line) later than the user A.

On the other hand, in the above conventional configuration B, the print processing of the normal job G1 is interrupted so that the print processing of the secure job S1 is preferentially executed, however, from the viewpoint of the user B, it is not desired that his/her print processing is interrupted.

However, in the present aspect, the print processing of the normal job G1 is put in a prohibited state until the secure job S1 is successfully authenticated. And then, when the authentication is succeeded, the print processing of the normal job G1 is conducted after the execution of the print processing of the secure job S1. Accordingly, the inconvenience for the user A, that the print processing of his/her secure job S1 has to wait due to the print processing of the normal job G1 of the user B, who has made a print request (has registered on a waiting line) later than the user A, can be solved. And also, the inconvenience for the user B that his/her print processing needs to be interrupted can be solved.

Figure 10:
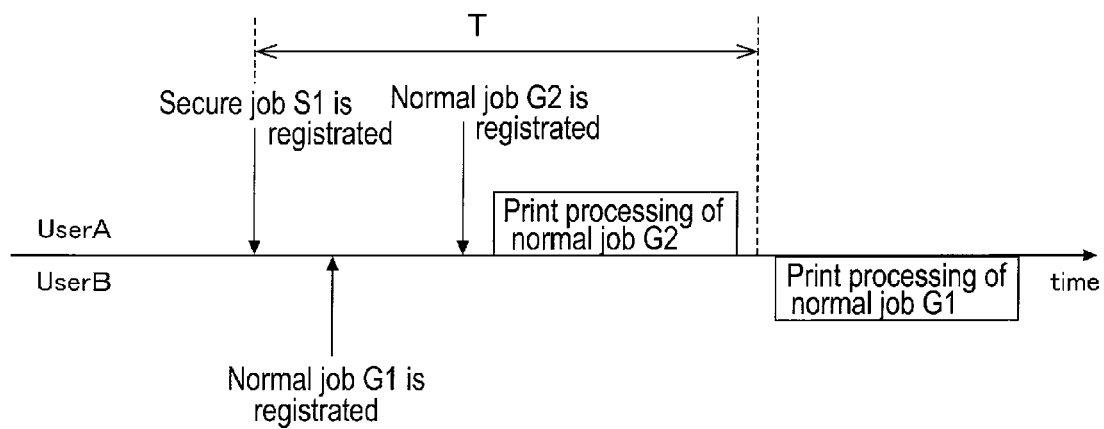
FIG. 10 is a time chart showing a relationship of registration/print processing between a secure job and a normal job.

In the present aspect, it is inconvenient for a user B when an unauthenticated state of the secure job S1 continues for a long time. Therefore, as shown in FIG. 10, when the authentication of the secure job S1 does not succeed within a reference time T from the time of registration, the print processing of the normal job G1 is allowed earlier than that of the secure job S1. Also, when the secure job S1 is unauthenticated, and even before the end of the passage of a reference time T, the print processing of the normal job G2 is allowed earlier than that of the secure job S1 if the user of the normal job G2 is the same person as the secure job S1. When the user of the normal job G2 is the same person as the secure job S1, it is hardly inconvenient for the user A even when the print processing of the normal job G2 is conducted first.

[Other Aspects]

The present invention is not limited to the aspects described in the above with reference to the accompanying figures, and, for example, the following can also be included in the technical scope of the present invention.

(1) The image forming apparatus 3 according to the above aspects may be an MFP comprising a printing function, a copy function, and a facsimile function, and may also be any of an electrophotographic system and an inkjet system.

(2) In the above aspects, as an authentication operation, a user inputs, for example, a password on the operation unit 19 in the image forming apparatus 3, however, the present invention is not limited to this, and if the image forming apparatus 3 is constituted by, for example, a removable external memory (such as an USB and a memory), the CPU 11 may read a password when a user attaches the external memory recording such as a password to the image forming apparatus 3. In addition, when the image forming apparatus 3 comprises a data reader such as a card reader, the CPU 11 may read such as the password when a user brings such as a card close to the data reader.

(3) Regarding the above judgment processing of prohibition target, the processing in FIG. 3 may be replaced by a configuration or may add a configuration, wherein print processing of a normal job as a subsequent job will not be in a prohibited state within a range, that the additional value of the total number of pages of the secure job S1 as the top job, each subsequent job, and the accumulated number of printed pages so far does not surpass the upper limit in S108. For example, in FIG. 7, when the secure job S1 has 10 pages, the normal job G1 has 10 pages, the normal job G2 has 20 pages, the accumulated number of printed pages so far is 970 pages, and the upper limit number of pages is set to 1000 pages, the normal job G1 is not regarded as a prohibition target job, while the normal job G2 is regarded as a prohibition target job. With this configuration, suspension of print processing of a secure job due to print processing of a subsequent normal job can be prevented.

(4) In regard to changing a reference time (S300 in FIG. 4), a correlation data between each user and a setting value of the reference time may be recorded in, for example, an NVRAM 17 (one example of a "memory"), so that the reference time may be changed to a setting value for the user of the secure job S1 based on the correlation data. Here, the CPU 11 functions as a "second changing unit". According to this configuration, a reference time can be changed according to each user by, for example, being extended for a user who sits far from the image forming apparatus 3.

(5) In addition, when making a print request by utilizing a secure function, a reference time may be input through the operation unit 39 in the computer 5 of each user (one example of a "setting unit"), so that a reference time in S300 of FIG. 4 is changed based on the input reference time. Here, the CPU 11 functions as a "third changing unit". According to this configuration, a reference time can be set when a user makes a print request for registration of a secure job, and can therefore be flexibly set in accordance with such as an usage environment of the image forming apparatus 3 at the time of the print request.

(6) In the above aspects, when a secure job is successfully authenticated, it may be judged whether or not the accumulated number of printed pages surpasses the upper limit number of pages if the print processing of the secure job is executed, and therefore it is impossible to execute the print processing. If the accumulated number of printed pages is judged to be surpassed (the accumulated number of printed pages so far the number of pages of the secure job>the upper limit number of pages), the secure job may be deleted from a waiting line. This is because the print processing of a secure job is preferred to become impossible in the middle of a process, and the accumulated number of printed pages may not reach the upper limit number of pages even when print processing of a subsequent job is conducted, if the registration of the secure job is deleted. Here, the CPU 11 functions as a "deleting unit".

(7) As a "print job", a job of PC printing is described as an example in the above aspects, however, the present invention is not limited to this, and, when an image forming apparatus has a copy function and a facsimile function, the job may be registered in the side of the image forming apparatus based on an execution command of theses functions. Also, when an image forming apparatus is constituted by a removable external memory (for example, an USB memory), and has a so-called direct print function for printing by directly retrieving data recorded in the external memory, the job may be registered based on a direct print command thereof.

(8) In the above aspects, each user has his/her own computer 5, however, the present invention is not limited to this, and a plurality of users may share one computer so that each user conducts a print request through the shared computer. According to this configuration, for example, when using the informing way (C) in the above S118 in FIG. 2, it is preferred that such as a message including "user identification information" of a secure job is displayed on a display unit of the above shared computer.

What is claimed is:

1. An image forming system comprising a computing device configured to output a first print job and a second print job to an image forming apparatus, said image forming system comprising:
a printing unit
a processor; and
memory storing computer-executable instructions that, when executed by the processor, cause the image forming system to:
register the first print job as a locked job when a print request includes an unlocking condition and as a normal job when a print request does not include an unlocking condition;
register the second print job, after registering the first print job, as a locked job when a print request includes an unlocking condition and as a normal job when a print request does not include an unlocking condition;
determine whether the first print job is registered as the locked job or the normal job;
determine whether the unlocking condition is fulfilled if the first print job is registered as the locked job;
control the printing unit to conduct print processing of the first print job if the first print job is registered as the locked job and the unlocking condition is fulfilled or if the first print job is registered as the normal job;
determine whether the second print job is registered as the locked job or the normal job;
set the second print job into a prohibited state in which print processing is prohibited until the first print job is printed in response to determining that the second print job is registered as the normal job and the first print job is registered as the locked job but the unlocking condition is not fulfilled;
judge whether the unlocking condition of the first print job is fulfilled within a reference time after registration of the first print job in response to determining that the first print job is registered as the locked job; and
unlock the prohibited state of the second print job without deleting the first print job in response to judging that the unlocking condition of the first print job is not fulfilled within the reference time.

2. The image forming system of claim 1, wherein the memory stores additional computer-executable instructions that, when executed by the processor, further cause the image forming system to:
change said reference time based on an amount of one or more subsequent print jobs to be printed after the first print job.

3. The image forming system of claim 1, wherein the memory stores additional computer-executable instructions that, when executed by the processor, further cause the image forming system to:
shorten the reference time as a total amount of one or more subsequent print jobs to be printed after the first print job increases.

4. The image forming system of claim 1, wherein the memory stores additional computer-executable instructions that, when executed by the processor, further cause the image forming system to:
extend the reference time based on a number of pages or a data amount of a print job that is to be subjected to print processing first when its prohibited state is unlocked.

5. The image forming system of claim 1, further comprising:
a memory block configured to store correlation information, including a setting value of said reference time for each user,
wherein the memory stores additional computer-executable instructions that, when executed by the processor, further cause the image forming system to change said reference time to a setting value for a user who generated a print request including said first print job based on said correlation information, wherein the first print job is registered as the locked job.

6. The image forming system of claim 1, wherein the memory stores additional computer-executable instructions that, when executed by the processor, further cause the image forming system to set said reference time based on a user input received at a time when the print request of said first print job is generated, wherein the first print job is registered as the locked job.

7. The image forming system of claim 1, wherein the memory stores additional computer-executable instructions that, when executed by the processor, further cause the image forming system to limit a number of pages printed during the print processing to a page limit, wherein the print processing is conducted one page at a time until the page limit is reached.

8. The image forming system of claim 1, wherein the memory stores additional computer-executable instructions that, when executed by the processor, further cause 1 the image forming system to delete said first print job if said first print job is registered as a locked job and printing a number of pages of the locked job would increase an accumulated number of printed pages above a page limit.

9. The image forming system of claim 1, wherein the memory stores additional computer-executable instructions that, when executed by the processor, further cause the image forming system to:

when the first print job is registered as a locked job and the unlocking condition is not fulfilled and when the second print job is registered as a normal job, determine whether a total number of pages of the first print job and the second print job surpasses a page limit; and refrain from setting the second print job into the prohibitive state when it is determined that the total number of pages of the first print job and the second print job does not surpass the page limit.

10. The image forming system of claim 1, wherein the memory stores additional computer-executable instructions that, when executed by the processor, further cause the image forming system to:

when the first print job is registered as a locked job and the unlocking condition is not fulfilled and when the second print job is registered as a normal job, determine whether a user who requested the second print job is the same as a user who requested the first print job; and refrain from setting the second print job into the prohibitive state when it is determined that the users are the same.

11. The image forming system of claim 1, wherein the memory stores additional computer-executable instructions that, when executed by the processor, further cause the image forming system to, when a plurality of locked jobs are registered, conduct print processing of whichever of the locked jobs has its unlocking condition fulfilled without limitation of registration order.

12. The image forming system of claim 1, wherein the first print job is registered as a locked job and the second print job is registered as a normal job, and wherein the memory stores additional computer-executable instructions that, when executed by the processor, further cause the image forming system to output an indication that the first print job is causing prohibition of print processing when the second print job is set into the prohibited state.

13. The image forming system of claim 12, wherein the indication indicates a user associated with the first print job that is causing the prohibition of print processing.

14. The image forming system of claim 1, wherein the first print job is registered as a locked job from a first user and the second print job is registered as a normal job from a second user different from the first user wherein said computing device comprises a display unit, and wherein the memory stores additional computer-executable instructions that, when executed by the processor, further cause the image forming system to, when the second print job is set into the prohibitive state, display an indication that the first print job is causing prohibition of print processing on said display unit of said computing device corresponding to a user of said first print job causing said prohibition.

15. An image forming apparatus comprising:
a printing unit
a processor; and
memory storing computer-executable instructions that, when executed by the processor, cause the image forming apparatus to:
register a first print job as a locked job when a print request includes an unlocking condition and as a normal job when a print request does not include an unlocking condition;
register a second print job, after registering the first print job, as a locked job when a print request includes an unlocking condition and as a normal job when a print request does not include an unlocking condition;
determine whether the first print job is registered as the locked job or the normal job;
determine whether the unlocking condition is fulfilled if the first print job is registered as the locked job;
control the printing unit to conduct print processing of the first print job if the first print job is registered as the locked job and the unlocking condition is fulfilled or if the first print job is registered as the normal job;
determine whether the second print job is registered as the locked job or the normal job;
set the second print job a into a prohibited state in which print processing is prohibited until the first print job is printed in response to determining that the second print job is registered as the normal job and the first print job is registered as the locked job but the unlocking condition is not fulfilled;
judge whether the unlocking condition of the first print job is fulfilled within a reference time after registration of the first print job in response to determining that the first print job is registered as the locked job; and
unlock the prohibited state of the second print job without deleting the first print job in response to judging that the unlocking condition of the first print job is not fulfilled within the reference time.

16. A non-transitory computer-readable medium storing computer-executable instructions that, when executed, cause an image forming apparatus to:
register the first print jobs as a locked job when a print request includes an unlocking condition and as a normal job when a print request does not include an unlocking condition;
register the second print job, after registering the first print job, as a locked job when a print request includes an unlocking condition and as a normal job when a print request does not include an unlocking condition;
determine whether the first print job is registered as the locked job or the normal job;
determine whether the unlocking condition is fulfilled if the first print job is registered as the locked job;
control the printing unit to conduct print processing of the first print job if the first print job is registered as the locked job and the unlocking condition is fulfilled or if the first print job is registered as the normal job;
determine whether the second print job is registered as the locked job or the normal job;
set the second print job into a prohibited state in which print processing is prohibited until the first print job is printed in response to determining that the second print job is registered as the normal job and the first print job is registered as the locked job but the unlocking condition is not fulfilled;
judge whether the unlocking condition of the first print job is fulfilled within a reference time after registration of the first print job in response to determining that the first print job is registered as the locked job; and
unlock the prohibited state of the second print job without deleting the first print job in response to judging that the unlocking condition of the first print job is not fulfilled within the reference time.

17. The image forming apparatus of claim 15, wherein the memory stores additional computer-executable instructions that, when executed by the processor, further cause the image forming apparatus to:

change said reference time based on an amount of one or more subsequent print jobs to be printed after the first print job.

18. The non-transitory computer-readable medium of claim 16 storing additional computer-executable instructions that, when executed, further cause the image forming apparatus to:
change said reference time based on an amount of one or more subsequent print jobs to be printed after the first print job.

* * * * *

UNITED STATES PATENT AND TRADEMARK OFFICE
CERTIFICATE OF CORRECTION

| | |
|---|---|
| PATENT NO. | : 8,472,049 B2 |
| APPLICATION NO. | : 12/411896 |
| DATED | : June 25, 2013 |
| INVENTOR(S) | : Yukiyoshi Hanayama |

Page 1 of 1

It is certified that error appears in the above-identified patent and that said Letters Patent is hereby corrected as shown below:

In the Claims:

In Column 10, Claim 8, Line 59:
    Please delete "1" after the phrase "further cause"

In Column 11, Claim 15, Line 57:
    Please insert a --;-- after the phrase "a printing unit"

In Column 12, Claim 16, Line 32:
    Please delete "print jobs as" and insert --print job as--

Signed and Sealed this
Twenty-first Day of October, 2014

Michelle K. Lee
*Deputy Director of the United States Patent and Trademark Office*